United States Patent
Lee et al.

(10) Patent No.: US 8,400,438 B2
(45) Date of Patent: Mar. 19, 2013

(54) DRIVING APPARATUS, DISPLAY APPARATUS HAVING THE DRIVING APPARATUS WITH NON-CONDUCTIVE ADHESIVE FILM AND METHOD OF MANUFACTURING THE DISPLAY APPARATUS

(75) Inventors: Seung-Jun Lee, Yongin-si (KR); Jang-Kyum Kim, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 587 days.

(21) Appl. No.: 12/622,892

(22) Filed: Nov. 20, 2009

(65) Prior Publication Data
US 2010/0182287 A1 Jul. 22, 2010

(30) Foreign Application Priority Data
Jan. 19, 2009 (KR) ........................ 10-2009-0004240

(51) Int. Cl.
*G06F 3/038* (2006.01)
(52) U.S. Cl. ........ 345/204; 345/214; 349/149; 349/150; 349/152
(58) Field of Classification Search ................. None
See application file for complete search history.

(56) References Cited

U.S. PATENT DOCUMENTS

| | | | | |
|---|---|---|---|---|
| 5,636,329 A | * | 6/1997 | Sukegawa et al. | 349/149 |
| 6,936,928 B2 | * | 8/2005 | Hedler et al. | 257/778 |
| 7,442,878 B2 | | 10/2008 | Bernier et al. | |
| 8,237,255 B2 | * | 8/2012 | Kim et al. | 257/690 |
| 2003/0174273 A1 | * | 9/2003 | Matsui et al. | 349/151 |
| 2004/0165138 A1 | * | 8/2004 | Hwang et al. | 349/152 |
| 2006/0146214 A1 | * | 7/2006 | Hwang et al. | 349/43 |
| 2006/0197900 A1 | * | 9/2006 | Yim et al. | 349/150 |
| 2007/0024795 A1 | * | 2/2007 | Kim | 349/152 |
| 2009/0011550 A1 | * | 1/2009 | Jeoung et al. | 438/155 |
| 2010/0052160 A1 | * | 3/2010 | Sun et al. | 257/737 |

FOREIGN PATENT DOCUMENTS

| | | |
|---|---|---|
| JP | 2007-214164 | 8/2007 |
| KR | 1020040017692 | 2/2004 |

OTHER PUBLICATIONS

English Abstract for Publication No. 1020040017692.
English Abstract for Publication No. 2007-214164.

* cited by examiner

*Primary Examiner* — Dismery Mercedes
(74) *Attorney, Agent, or Firm* — F. Chau & Associates, LLC

(57) ABSTRACT

A display apparatus includes a display panel on which a pad part is formed, a driving chip including bumps making contact with the pad part, and a non-conductive adhesive film disposed between the display panel and the driving chip attaching the driving chip to the pad part. Each of the bumps includes a step-difference portion including a non-conductive elastic polymer and a bump line formed on the step-difference portion. The bump line is provided with a fine pattern through which a portion of the step-difference portion is exposed, and the bump line makes contact with the pad part. Accordingly, the reliability of the electrical connection between the driving chip and the display panel may be increased.

7 Claims, 6 Drawing Sheets

DRIVING APPARATUS, DISPLAY APPARATUS HAVING THE DRIVING APPARATUS WITH NON-CONDUCTIVE ADHESIVE FILM AND METHOD OF MANUFACTURING THE DISPLAY APPARATUS

CROSS-REFERENCE TO RELATED APPLICATION

This application relies for priority upon Korean Patent Application No. 10-2009-0004240 filed on Jan. 19, 2009, the contents of which are herein incorporated by reference in its entirety.

BACKGROUND

1. Technical Field

The present invention relates to a driving apparatus, a display apparatus, a method of manufacturing the display apparatus. More particularly, the present invention relates to a driving apparatus, a display apparatus having a driving apparatus attached using a non-conductive adhesive film and a method of manufacturing the display apparatus.

2. Discussion of the Related Art

Many flat panel display apparatuses such as liquid crystal displays, electrophoretic displays and plasma displays having a light weight and slim design have been developed in recent years. Among them, the liquid crystal display has various properties, such as light weight, thin profile, low power consumption, etc. The liquid crystal display has thus been applied to various electric appliances such as notebook computers, desktop computers, television sets, and the like.

The liquid crystal display produces images by exploiting an optical anisotropic property of a liquid crystal. The liquid crystal display applies an electric field to the liquid crystal to control a transmittance of light passing through the liquid crystal, thereby displaying desired images. To this end, the liquid crystal display includes a display panel in which the liquid crystal is provided and a driving apparatus such as a driving chip to drive the display panel.

The driving chip converts externally received image signals into driving signals appropriate to drive the display panel and applies the driving signals to the display panel. The driving chip is generally attached to the display panel using an anisotropic conductive film. The anisotropic conductive film includes conductive balls. The conductive balls include polymer beads, each of which is coated with a conductive metal to electrically connect the driving chip to the display panel.

However, manufacturing of the anisotropic conductive film including the conductive balls can be relatively complex and expensive. In addition, since the conductive balls are irregularly distributed in the anisotropic conductive film, the driving chip is electrically connected with the display panel.

SUMMARY

Exemplary embodiments of the present invention provide a driving apparatus having a robust connection with a display apparatus.

Exemplary embodiments of the present invention provide a display apparatus capable of being manufactured using a simplified process that is relatively fast and inexpensive.

Exemplary embodiments of the present invention also provide a method of manufacturing the display apparatus.

In an exemplary embodiment of the present invention, a driving apparatus includes a bump. The bump includes a step-difference portion comprising a non-conductive elastic polymer and a bump line formed on the step-difference portion. The bump line is provided with a fine pattern through which a portion of the step-difference portion is exposed. The driving apparatus further includes a driving circuit. One end of the bump line extends to and is connected to the driving circuit.

The fine pattern includes at least one penetrating hole, or at least one slit extending in a same direction as a longitudinal direction of the bump line. The bump line is divided into a plurality of sub bump lines by the slits.

In an exemplary embodiment of the present invention, a display apparatus includes a display panel on which a pad part is formed. A driving chip includes bumps making contact with the pad part. A non-conductive adhesive film is disposed between the display panel and the driving chip to attach the driving chip to the pad part. Each of the bumps includes a step-difference portion comprising a non-conductive elastic polymer and a bump line foamed on the step-difference portion. The bump line is provided with a fine pattern through which a portion of the step-difference portion is exposed. The bump line makes contact with the pad part.

The driving chip further includes a driving circuit. One end of the bump line extends to and is connected to the driving circuit.

The fine pattern includes at least one penetrating holes, or at least one slit extending in a same direction as a longitudinal direction of the bump line. The bump line is divided into a plurality of sub bump lines by the slit.

The bump line includes at least one of gold (Au), chromium (Cr), silver (Ag), molybdenum (Mo), aluminum (Al), copper (Cu), titanium (Ti), indium tin oxide (ITO), indium zinc oxide (IZO), or an alloy thereof, and the non-conductive elastic polymer includes at least one of polyimide, polyacrylate, polycarbonate, polyepoxy, or polyacryl.

A difference between an elasticity modulus of the non-conductive adhesive film and an elasticity modulus of the step-difference portion is less than or equal to 0.5 GPa. The non-conductive adhesive film has the elasticity modulus of about 1.5 GPa to about 5.0 GPa. The non-conductive elastic polymer has an elasticity modulus of about 1.5 GPa to about 5.0 GPa.

The display panel includes a first substrate connected to the driving chip, a second substrate facing the second substrate, and a liquid crystal layer disposed between the first substrate and the second substrate.

In an exemplary embodiment of the present invention, a method of manufacturing a display apparatus is provided as follows. When a driving chip including a step-difference portion and bumps including bump lines formed on the step-difference portion is prepared and a display panel on which a conductive pad part is formed is prepared, a non-conductive adhesive film is pre-pressurized onto the pad part. The step-difference portion includes a non-conductive elastic polymer and the bump lines are provided with a fine pattern formed therethrough. Then, the driving chip is pre-pressurized onto the non-conductive adhesive film, and the driving chip is post-pressurized such that the bumps make contact with the pad part. A portion of the non-conductive adhesive film is positioned inside the fine pattern by the pre-pressurizing of the driving chip.

The pre-pressurizing of the non-conductive adhesive film is performed at a pressure of about 0.1 MPa to about 10 MPa, and the non-conductive adhesive film has an elasticity modulus of about 1.5 GPa to about 5.0 GPa.

The pre-pressurizing of the driving chip is performed at a pressure of about 0.1 MPa to about 10 MPa, the post-pressurizing of the driving chip is performed at a pressure of about 30 MPa to about 150 MPa, and the post-pressurizing of the driving chip is performed during a time of about 2 seconds to about 15 seconds.

During the post-pressurizing of the driving chip, the driving chip is post-pressurized by a pressurizer. The display panel is supported by a supporter. A temperature transmitted to the driving chip from the pressurizer is from about 130° Celsius to about 180° Celsius and a temperature transmitted to the display panel from the supporter is from about 40° Celsius to about 90° Celsius.

Accordingly, the driving chip is attached to the display panel by the non-conductive adhesive film in which no conductive balls are included, thereby simplifying a manufacturing process. As a result, a manufacturing cost may be reduced and product quality defects may be prevented. In addition, the reliability of the electrical connection between the driving chip and the display panel may be increased.

BRIEF DESCRIPTION OF THE DRAWINGS

The above and other features and aspects of exemplary embodiments of the present invention will become readily apparent by reference to the following detailed description when considered in conjunction with the accompanying drawings wherein.

DETAILED DESCRIPTION OF EXEMPLARY EMBODIMENTS

It will be understood that when an element or layer is referred to as being "on", "connected to" or "coupled to" another element or layer, it can be directly on, connected or coupled to the other element or layer or intervening elements or layers may be present. Like numbers may refer to like elements throughout the disclosure.

Hereinafter, exemplary embodiments of the present invention will be explained in detail with reference to the accompanying drawings.

Figure 1:
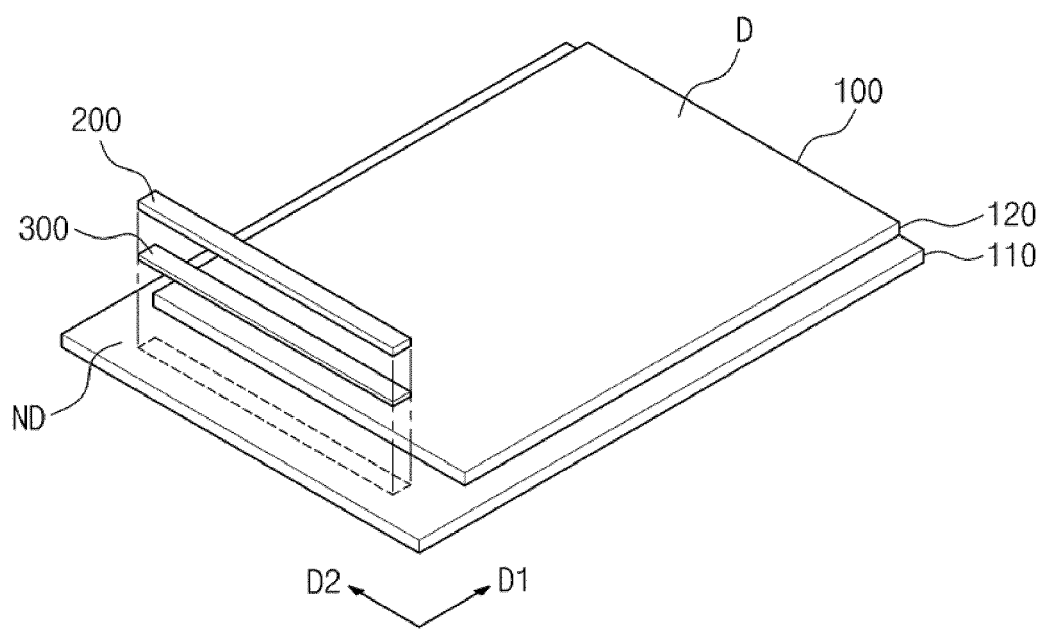
FIG. 1 is an exploded perspective view showing a display panel according to an exemplary embodiment of the present invention.
Figure 2:
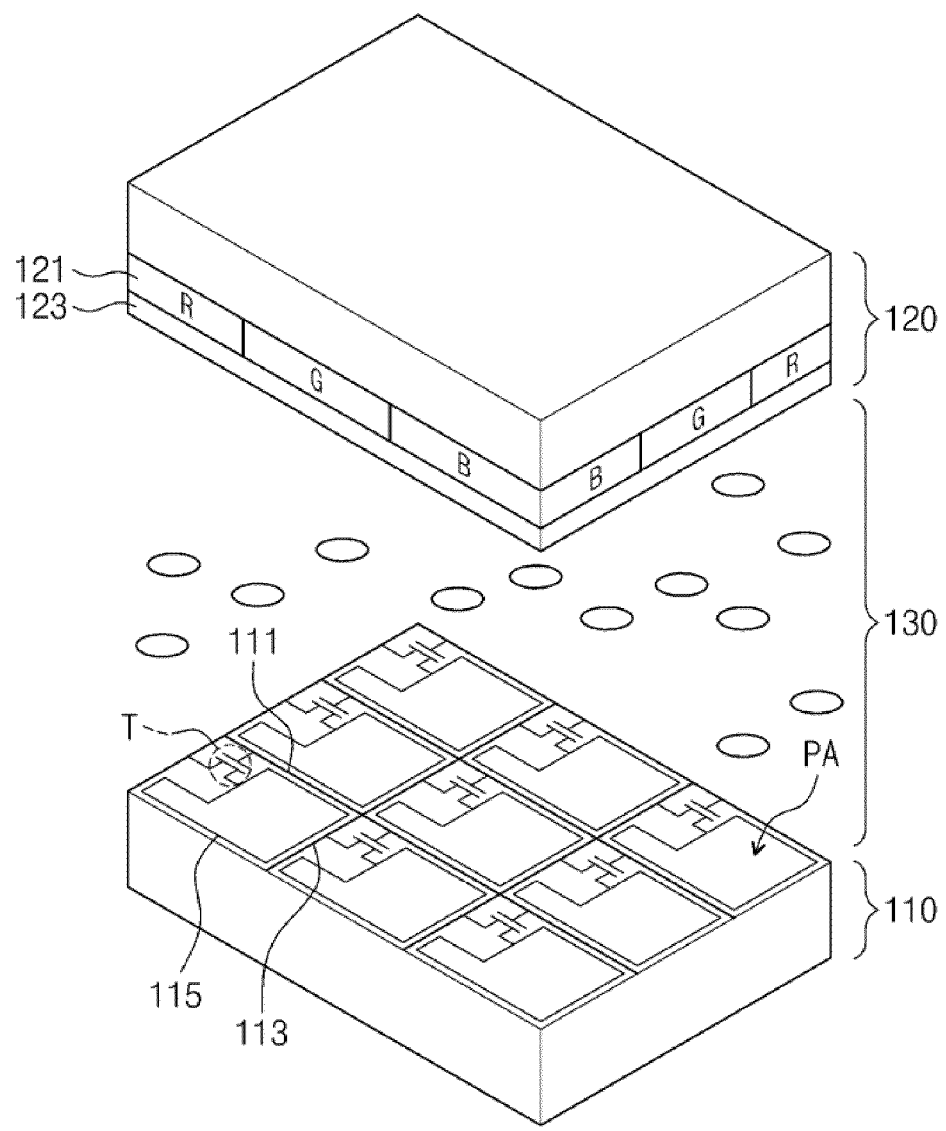
FIG. 2 is an exploded perspective view showing a display part of the display panel of FIG. 1.

FIG. 1 is an exploded perspective view showing a display panel according to an exemplary embodiment of the present invention and FIG. 2 is an exploded perspective view showing a display part of a display panel of FIG. 1. Particularly, FIG. 1 shows a connection structure for connecting a driving chip with a display panel.

Referring to FIG. 1, a display panel 100 includes a display part D in which an image is displayed and a non-display part ND adjacent to the display part D and surrounding a portion, or all, of the display part D, in a plan view.

The non-display part ND is provided with a gate pad part and a data pad part, which are formed thereon. The gate pad part and the data pad part may be formed along different side portions of the display part D or together along one side portion of the display part D. For the convenience of explanation, the gate pad part and the data pad part are described herein as being formed together along one side portion of the display part D. In addition, the gate pad part extends from gate lines 111 (see FIG. 2) and the data pad part extends from data lines 113 (see FIG. 2), and the gate pad part and the data pad part include a conductive material.

Referring to FIG. 2, the display part D of the display panel 100 includes a thin film transistor substrate 110, a color filter substrate 120 facing the thin film transistor substrate 110, and a liquid crystal layer 130 interposed between the thin film transistor substrate 110 and the color filter substrate 120.

The gate lines 111 are formed on the thin film transistor substrate 110 and the data lines 113 are formed on the thin film transistor substrate 110 and cross the gate lines 111 so that a plurality of pixel areas PA is defined on the thin film transistor substrate 110. Each pixel area PA includes a thin film transistor T and a pixel electrode 115. The thin film transistor T is electrically connected to a corresponding gate line of the gate lines 111 and a corresponding data line of the data lines 113, and the pixel electrode 115 is electrically connected to the thin film transistor T. The gate lines 111 receive a gate signal from the driving chip 200 and transmit the gate signal to the thin film transistor T, and the data lines 113 receive an image signal from the driving chip 200 and transmit the image signal to the pixel electrode 115 through the thin film transistor T.

The color filter substrate 120 includes a color filter 121 and a common electrode 123. The color filter 121 includes red R, green G, and blue B color filters to display a predetermined color while light passes therethrough. The common electrode 123 is formed on the color filter 121 and applies an electric filed to the liquid crystal layer 130 in cooperation with the pixel electrode 115.

When a common voltage is applied to the common electrode 123 and the thin film transistor T is turned on in response to an external power-supply voltage, the electric field is formed between the pixel electrode 115 and the common electrode 123. The electric field varies an alignment of liquid crystal molecules of the liquid crystal layer 130 between the thin film transistor substrate 110 and the color filter substrate 120, and thus a transmittance of the liquid crystal layer 130 with respect to the light passing through the liquid crystal layer 130 is varied, thereby displaying desired images.

The driving chip 200 includes integrated circuits and applies the gate signal and the image signal to the gate lines 111 and the data lines 113, respectively. In addition, a non-conductive adhesive film 300 is disposed between the driving chip 200 and the thin film transistor substrate 110, and the driving chip 200 is attached to the thin film transistor substrate 110 by the non-conductive adhesive film 300.

Figure 3A:
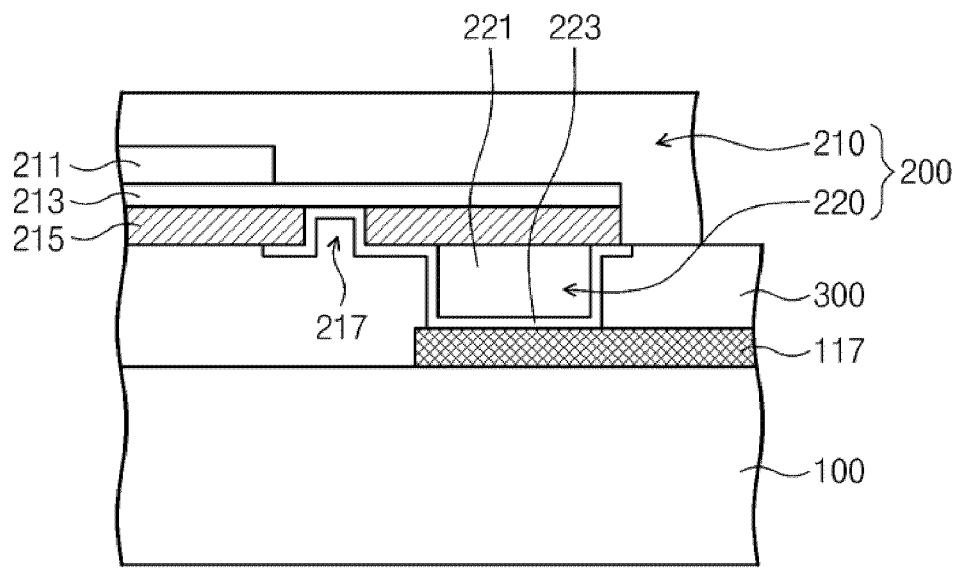
FIG. 3A is a sectional view of a portion of the display panel as viewed in a first direction D1 of FIG. 1.
Figure 3B:
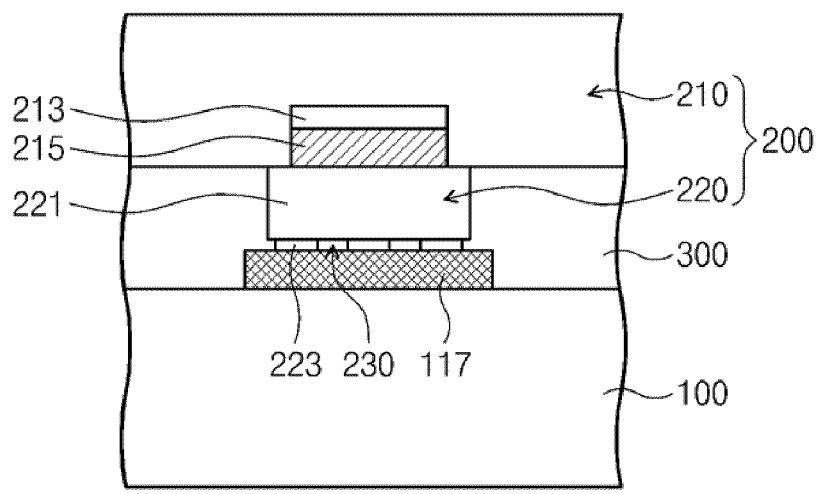
FIG. 3B is a sectional view of a portion of the display panel as viewed in a second direction D2 of FIG. 1.

FIG. 3A is a sectional view of a portion of the display panel as viewed in a first direction D1 of FIG. 1, and FIG. 3B is a sectional view of a portion of the display panel as viewed in a second direction D2 of FIG. 1.

Referring to FIGS. 3A and 3B, a pad part 117 is formed on the display panel 100. The pad part 117 includes the gate pad part extended from the gate lines 111 and the data pad part extended from the data lines 113.

The driving chip 200 includes a body 210 and bumps 220. The body 210 makes electrical contact with the pad part 117 through the bumps 220.

The non-conductive adhesive film 300 is disposed between the display panel 100 and the driving chip 200 to fix the driving chip 200 to the pad part 117.

The body 210 includes a driving circuit 211 mounted thereon and includes an insulating material. The driving circuit 211 converts the externally received image signals into driving signals appropriate to drive the display panel 100 and applies the driving signals to the display panel 100. The driving circuit 211 is formed by a semiconductor process.

Each bump 220 includes a step-difference portion 221 and a bump line 223 formed on the step-difference portion 221.

The step-difference portion 221 protrudes from the body 210 to the display panel 100, thereby defining a step-difference. The step-difference portion 221 includes a non-conductive elastic polymer. Since the step-difference portion 221 includes polymer having electrically insulating properties and has elasticity, the step-difference portion 221 may maintain its initial shape while a pressure is applied to the step-difference portion 221. Due to the elasticity of the step-difference portion 221, the driving chip 200 may be stably attached to the display panel 100. According to an exemplary embodiment of the present invention, the non-conductive elastic polymer may include one or more of polyimide, polyacrylate, polycarbonate, polyepoxy, polyacryl, or a copolymer including one or more of the above. The copolymer has an elasticity modulus from about 1.5 GPa to about 5.0 GPa.

The bump line 223 is arranged on an upper surface of the step-difference portion 221. The bump line 223 may directly contact the pad part 117. An upper surface of the bump line 223 may make contact with a surface of the pad part 117 of the display panel 100.

One end of the bump line 223 is extended to the driving circuit 211 and is connected to the driving circuit 211. In addition, as shown in FIG. 3A, the bump line 223 extends to at least one side surface of the step-difference portion 221 as well as the upper surface of the step-difference portion 221.

A connection line 213 is disposed between the extended portion of the bump line 223 and the driving circuit 211. The connection line 213 may be formed on a portion of the driving circuit 211 such that the connection line 213 makes contact with the driving circuit 211. A protection layer 215 is formed on the connection line 213 to protect and insulate the driving circuit 211 and the connection line 213. The protection layer 215 is partially removed to define a contact hole 217 through which a portion of the connection line 213 is exposed. The bump line 223 extends to the contact hole 217 and is electrically connected to the connection line 213 through the contact hole 217 and the driving circuit 211 is electrically connected to the pad part 117 by the bump line 223.

The bump lins 223 may include a metal material or a metal oxide material, which has a high conductivity, for example gold (Au), chromium (Cr), silver (Ag), molybdenum (Mo), aluminum (Al), copper (Cu), titanium (Ti), indium tin oxide (ITO), indium zinc oxide (IZO), and/or an alloy thereof.

The bump line 223 may be provided with a fine pattern passing therethrough. According to an exemplary embodiment of the present invention, the fine pattern includes at least one slit 230.

Figure 4:
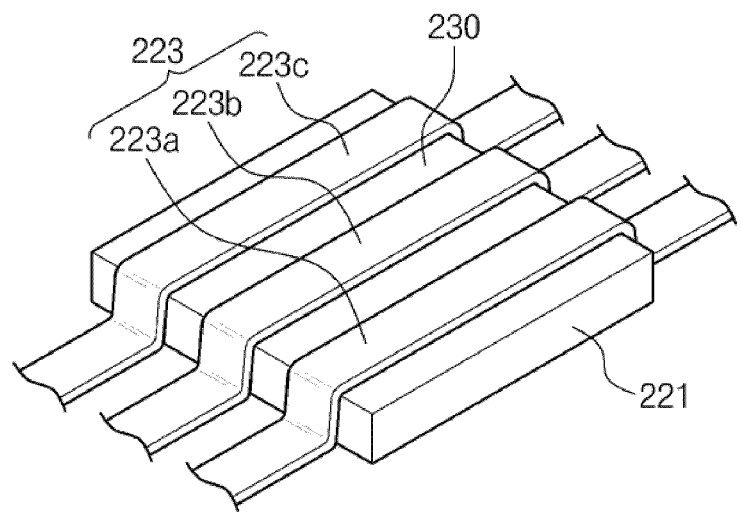
FIG. 4 is a perspective view showing a bump line according to an exemplary embodiment of the present invention.

FIG. 4 is a perspective view showing a bump line according to an exemplary embodiment of the present invention. In FIG. 4, for the convenience of explanation, the bump line 223 is placed on the upper surface of the step-difference portion 221.

As shown in FIG. 4, the fine pattern includes two slits 230 and the bump line 223 include three sub-bump lines 223a, 223b, and 223c. The slits 230 have a shape that extends in a direction parallel to the bump line 223 and extends to the ends of the bump line 223. Accordingly, portions of the upper surface of the step-difference portion 221 disposed under the bump line 223 may be exposed through the slits 230.

The number of the slits 230 is not limited to two, however if too many slits are formed, a contact area between the pad part 117 and the bump line 223 decreases, thereby deteriorating the contact characteristics between the pad part 117 and the bump line 223.

According to an exemplary embodiment of the present invention, the fine pattern may include at least one penetrating hole 230' formed through the bump line 223.

Figure 5:
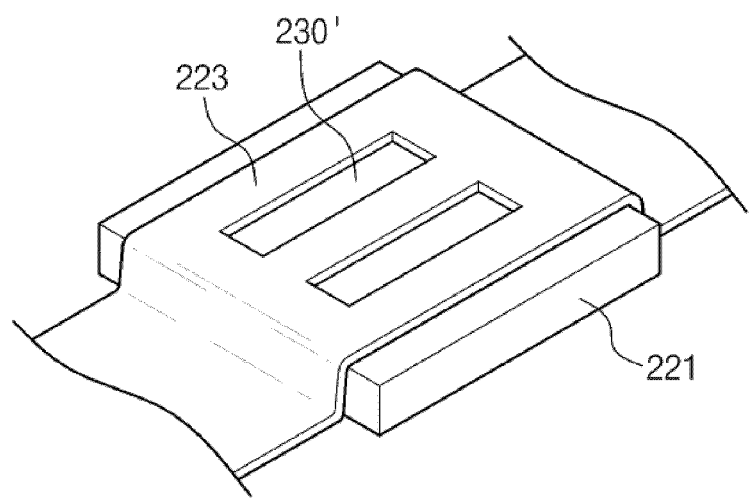
FIG. 5 is a perspective view showing a bump line according to an exemplary embodiment of the present invention.

FIG. 5 is a perspective view showing a bump line according to an exemplary embodiment of the present invention. In FIG. 5, for the convenience of explanation, the bump lines 223 are placed on the upper surface of the step-difference portion 221.

As shown in FIG. 5, the penetrating hole 230' is formed through the bump line 223, and thus portions of the upper surface of the step-difference portion 221 disposed under the bump line 223 are exposed. In this figure, the penetrating hole 230' has a substantially rectangular shape, however the shape of the penetrating hole 230' is not limited thereto and may have various shapes such as a substantially circular shape, a substantially oval shape, or another geometric shape.

The slits 230 and the penetrating hole 230' are filled with the non-conductive adhesive film 300 to contact the driving chip 200 with the display panel 100. Accordingly, the driving chip 200 may make stable contact with the display panel 100 by the non-conductive adhesive film 300, and the rate of contact defects may be reduced and the contact reliability between the driving chip 200 and the display panel 100 may be increased. Additional details pertaining to these configurations are discussed below.

In some display panels, a gold (Au) bump is formed on a connection line exposed through a contact hole. However, when the bump is formed on the connection line exposed through the contact hole, a dimple is formed on an upper surface of the bump due to a step-difference under the bump. As a result, although the pad of the conventional display panel makes contact with the bump in a surface contact manner, the surface contact area between the pad and the bump decreases by the size of the dimple.

In addition, for some display panels, a bulk-type bump is formed on a flexible substrate by using a metal material such as gold. However, these panels may be particularly vulnerable to humidity and heat. For example, where the flexible substrate is a plastic substrate, the flexible substrate is easily deformed by the humidity and heat and the bump of the metal material is not deformed relative to the flexible substrate, so that the contact portions between the flexible substrate and the bump are separated from each other.

According to exemplary embodiments of the present invention, the bump line is formed on the step-difference portion after forming the step-difference portion by using the non-conductive elastic polymer, thereby reducing defects such as the dimple described above. As a result, although the thin film transistor substrate is deformed, defects of the bump line, which is caused by the deformation of the thin film transistor substrate, may be reduced or prevented.

In addition, according to an exemplary embodiment of the present invention, the non-conductive adhesive film is placed in the penetrating hole in which the fine pattern is not formed, thereby increasing the contact reliability between the driving chip and the display panel. As described above, when the upper surface of the step-difference portion is partially exposed through the fine pattern and the non-conductive adhesive film is disposed in the fine pattern, adhesive force between the bump line and the pad part is enhanced. Thus, the adhesive force between the bump line and the pad part, which is caused by the non-conductive adhesive film, may be increased as compared with the case when the contact surface of the bump line, which makes contact with the pad part, is formed by using only the metal material.

The non-conductive adhesive film 300 is formed between the display panel 100 and the driving chip 200 corresponding to a region in which the bumps 220 are not formed.

The non-conductive adhesive film 300 attaches the driving chip 200 to the display panel 100. The non-conductive adhesive film 300 has the elasticity modulus of about 1.5 GPa to about 5.0 GPa to effectively attach the driving chip 200 to the display panel 100. If the elasticity modulus of the non-conductive adhesive film 300 is smaller than 1.5 GPa, the driving chip 200 may be collided with the display panel 100 while pressing the driving chip 200 to the display panel 100, thereby causing defects. On the contrary, if the elasticity modulus of the non-conductive adhesive film 300 is greater than 5.0 GPa, the driving chip 200 is difficult to attach to the display panel. The non-conductive adhesive film 300 may include polymer resin.

The polymer resin may be a heat-curable resin. Accordingly, the non-conductive adhesive film 300 may be in a liquid state, a semi-liquid state or may be otherwise soft during the attachment of the driving chip 200 to the display panel 100 and may then be cured by heat during the successive curing process. Accordingly, the driving chip 200 may be firmly fixed to the display panel 100.

In order to attach the driving chip 200 to the display panel 100, according to some exemplary embodiments of the present invention, an adhesive film in which conductive balls having conductivity are distributed is used, however the non-conductive adhesive film 300 does not need to include the conductive balls.

As described above, the driving signals from the driving circuit 211 are applied to the display panel 100 through the connection line 213 and the bump line 223 to display the images, so that the reliability of electrical connection between the driving chip 200 and the display panel 100 may be improved as compared with the conventional display panel.

In addition, the liquid crystal display panel has been described herein as a representative example, but it should be noted that the present invention is applicable to various display panels such as a plasma display panel, an electrophoretic display panel, etc.

Hereinafter, a method of manufacturing the display apparatus having the above-described configuration will be described in detail.

Figure 6:
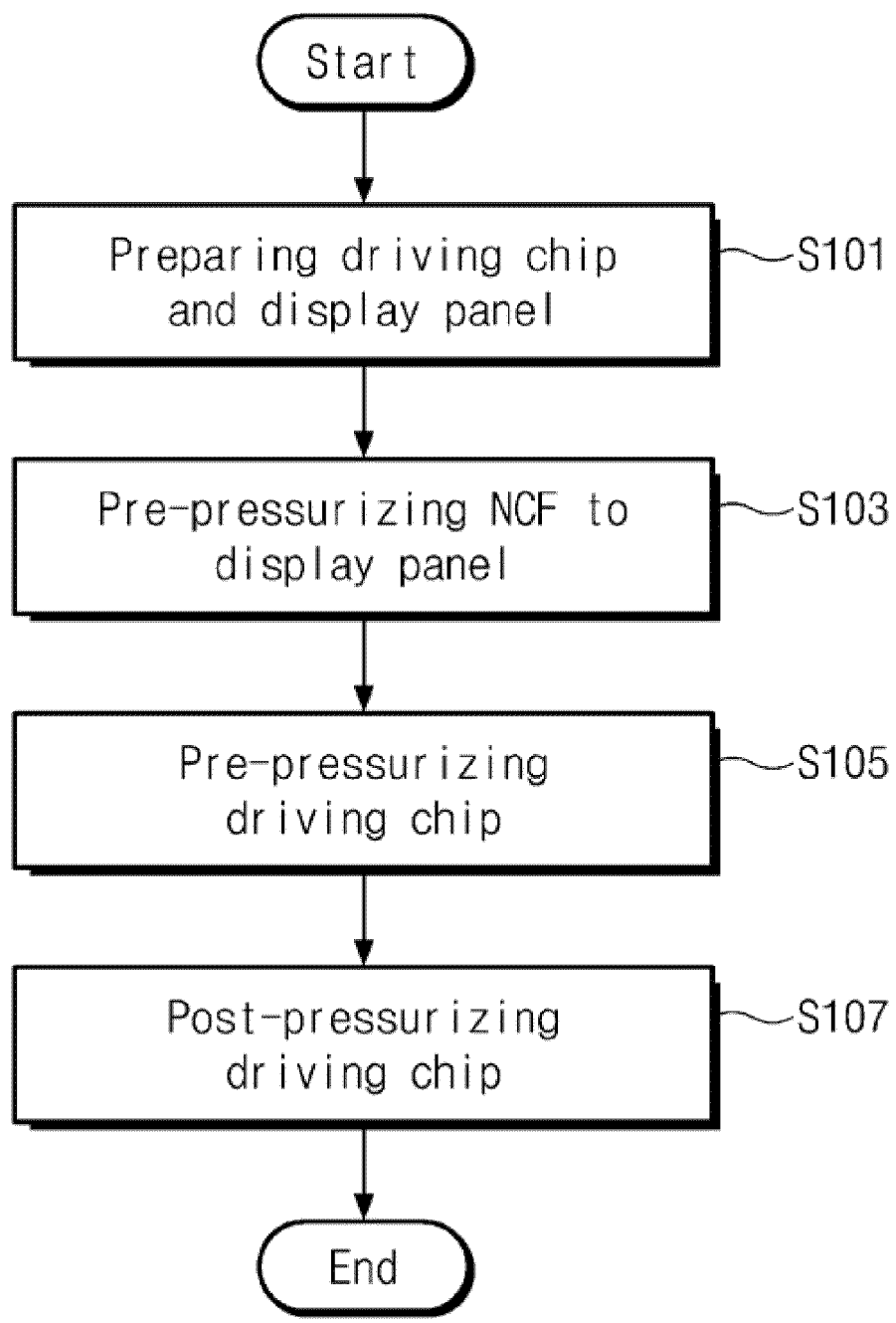
FIG. 6 is a flow chart showing a method of manufacturing a display panel according to an exemplary embodiment of the present invention.
Figure 7:
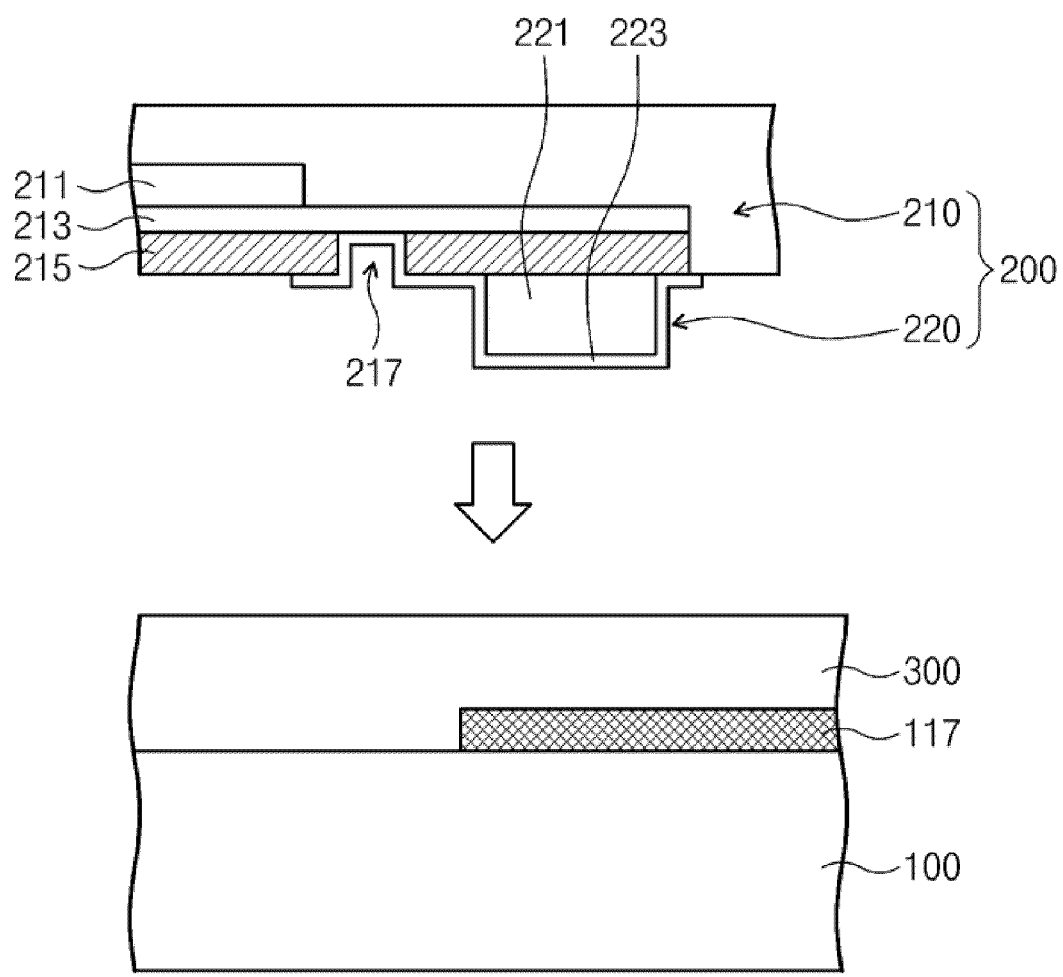
FIG. 7 is sectional view showing a pre-pressurizing process of a driving chip of FIG. 6.

FIG. 6 is a flow chart showing a method of manufacturing a display panel according to an exemplary embodiment of the present invention, and FIG. 7 is sectional view showing a pre-pressurizing process of a driving chip of FIG. 6.

Referring to FIGS. 1, 5 and 6, the method of manufacturing the display apparatus includes preparing the display panel 100 and the driving chips 200 (S101) and attaching the driving chip 200 to the display panel 100 by pre-pressurizing the non-conductive adhesive film 300 to the display panel 100 (S103), pre-pressurizing the driving chip 200 (S105), and post-pressurizing the driving chip 200 (S107).

In forming the driving chip 200, the driving circuit 211 is formed on the body 210 and the bumps 220 are formed on the body 210 to be connected to the driving circuit 211.

The driving circuit 211 may be formed by using a semiconductor process to which a photolithography process is applied several times. The connection line 213 is formed on the driving circuit 211 using the conductive material, and the insulating material is formed on the connection line 213 to form the protection layer 215. The protection layer 215 is provided with the contact hole 217 formed therethrough and the portion of the connection line 213 is thus exposed. The contact hole 217 may be formed by using a photolithography process.

In forming the bump 220, the step-difference portion 221 is formed on the body 210 using the non-conductive elastic polymer, on which the driving circuit 211 is formed. The step-difference portion 221 may be foamed by using various methods such as a printing method, a photolithography method, or the like.

The non-conductive elastic polymer may include one or more of polyimide, polyacrylate, polycarbonate, polyepoxy, or polyacryl, or a copolymer including at least one of the above. The copolymer has the elasticity modulus from about 1.5 GPa to about 5.0 GPa.

Then, the bump line 223 is formed on the step-difference portion 221. The bump line 223 is fanned by depositing the conductive material over the body 210 and patterning the deposited conductive material using the photolithography process. The bump line 223 is electrically connected to the connection line 213 through the contact hole 217. The bump line 223 may include a metal material or a metal oxide material having a high conductivity, for example gold (Au), chromium (Cr), silver (Ag), molybdenum (Mo), aluminum (Al), copper (Cu), titanium (Ti), indium tin oxide (ITO), indium zinc oxide (IZO), or an alloy thereof.

The display panel 100 on which the pad part 117 is formed is prepared by using the photolithography process (S101).

Next, the non-conductive adhesive film 300 is pre-pressurized to the pad part 117 of the display panel 100 (S103). The pre-pressurizing process for the non-conductive adhesive film 300 is performed at the pressure of about 0.1 MPa to about 1 0MPa. In this case, the non-conductive adhesive film 300 has the elasticity modulus of about 1.5 GPa to about 5.0 GPa.

In the present exemplary embodiment, a difference between the elasticity modulus of the non-conductive adhesive film 300 and the elasticity modulus of the step-difference portion 221 may be lower than about 0.5 GPa. This is because the non-conductive adhesive film 300 may be separated from the step-difference portion 221 if the difference between the elasticity modulus of the non-conductive adhesive film 300 and the elasticity modulus of the step-difference portion 221 exceeds about 0.5 GPa.

Then, as shown in FIG. 7, the driving chip 200 is pre-pressurized to the non-conductive adhesive film 300 (S105). The pre-pressurizing process for the driving chip 200 is performed at the pressure of about 0.1 Mpa to about 10 MPa as similar to the pre-pressurizing process for the non-conductive adhesive film 300. As a result, portions of the non-conductive adhesive film 300 are positioned inside the fine patterns 230.

During the pre-pressurizing process for the non-conductive adhesive film 300 or the driving chip 200, if the pre-pressurizing process is performed at the pressure lower than about 0.1 MPa, the adhesive force between the non-conductive adhesive film 300 and the display panel 100 may be deteriorated. In addition, if the pre-pressurizing process is performed at the pressure higher than about 10 MPa, the non-conductive adhesive film 300 may be deformed due to the excessive pressure, thereby causing defects on the non-conductive adhesive film 300. Accordingly, the pre-pressurizing process for the non-conductive adhesive film 300 and the driving chip 200 may be performed at the pressure of about 0.1 MPa to about 10 MPa according to an exemplary embodiment of the present invention, while pre-pressurizing may still be performed at pressures of less than 0.1 MPa or above 10 MPa according to other exemplary embodiments of the present invention.

After the pre-pressurizing process for the driving chip 200, the driving chip 200 is post-pressurized such that the bump lines 223 make contact with the pad part 117 in the surface contact manner (S107).

The post-pressurizing process for the driving chip 200 is performed at the pressure of about 30 MPa to about 150 MPa. In addition, the post-pressurizing process for the driving chip 200 is performed during a time period of about 2 seconds to about 15 seconds.

If the post-pressurizing process for the driving chip 200 is performed at the pressure lower than about 30 MPa, the time required to make contact the bumps 220 of the driving chip 200 to the pad part 117 of the display panel 100 is relatively lengthened. As a result, the non-conductive adhesive film 300 is cured before the polymer resin of the non-conductive adhesive film 300 flows outwardly from the pad part 117, so that the bumps 220 of the driving chip 200 may not make contact with the pad part 117 of the display panel 100 due to the residual of the polymer resin of the non-conductive adhesive film 300, which is remained between the bumps 220 and the pad part 117. Whereas, if the post-pressurizing process for the driving chip 200 is performed at the pressure higher than about 150 MPa, the metal layer for the bumps 220 may be deformed due to the excessive pressure, thereby causing defects on the bumps 220. Accordingly, the post-pressurizing process for the driving chip 200 may be performed at the pressure of about 30 MPa to about 150 MPa according to one exemplary embodiment of the present invention, while post-pressurizing may be performed at a pressure of less than 30 MPa or greater than 150 MPa according to other exemplary embodiments of the present invention.

The post-pressurizing process for the driving chip 200 is performed by a pressurizer (not shown) that pressurizes the driving chip 200 at a constant temperature. In this post-pressurizing process for the driving chip 200, the temperature applied to the upper surface of the driving chip 200 by the pressurizer is set to about from 130° Celsius to about 180° Celsius.

If the temperature applied to the upper surface of the driving chip 200 is lower than about 130° Celsius during the post-pressurizing process, the cure ratio of the polymer resin for the non-conductive adhesive film 300 is lowered, thereby deteriorating the adhesive force between the driving chip 200 and the display panel 100. Whereas, if the temperature applied to the upper surface of the driving chip 200 is higher than about 180° Celsius, the polymer resin of the non-conductive adhesive film 300 is over-cured. Thus, the temperature applied to the upper surface of the driving chip 200 may be from about 130° Celsius to about 180° Celsius during the post-pressurizing process of the driving chip 200 according to one exemplary embodiment of the present invention, while the temperature applied to the upper surface of the driving chip 200 may be less than 130° Celsius or greater than 180° Celsius according to other exemplary embodiments of the present invention.

In addition, a temperature of a supporter (not shown) supporting the display panel 100 during the post-pressurizing process of the driving chip 200, for example, a temperature transmitted to the display panel 100 from the supporter is in a range from about 40° Celsius to about 90° Celsius.

According to the above, the driving chip is attached to the display panel by the non-conductive adhesive film in which no conductive balls are included, thereby simplifying a manufacturing process. As a result, a manufacturing cost may be reduced and product quality defects may be prevented.

In addition, the bump lines making contact with the driving chip and the display panel in the surface contact manner is provided with the penetrating hole formed therethrough and the non-conductive adhesive film is placed in the penetrating hole, so that the reliability of the electrical connection between the driving chip and the display panel may be increased.

Although the exemplary embodiments of the present invention have been described, it is understood that the present invention should not be limited to these exemplary embodiments but various changes and modifications can be made by one ordinary skilled in the art within the spirit and scope of the present invention.

What is claimed is:

1. A display apparatus comprising:
   a display panel on which a plurality of pad parts are formed;
   a driving chip comprising a plurality of bumps, each of the bumps making contact with a corresponding pad part of the plurality of pad parts; and
   a non-conductive adhesive film disposed between the display panel and the driving chip to attach the driving chip to the plurality of pad parts,
   wherein each bump of the plurality of bumps comprises:
      a connection line;
      a protection layer provided with a contact hole formed therethrough exposing a portion of the connection line;
      a step-difference portion which comprises a non-conductive elastic polymer and is spaced apart from the contract hole; and
      a bump line formed on the step-difference portion, having a fine pattern through which an upper surface of the step-difference portion is exposed, and making contact with the pad part,
   wherein the non-conductive adhesive film is disposed in the fine pattern.

2. The display apparatus of claim 1, wherein the driving chip further comprises a driving circuit, wherein one end of the bump line for each bump of the plurality of bumps is connected to the driving circuit.

3. The display apparatus of claim 1, wherein the fine pattern comprises at least one hole penetrating the entire height of the bump line for each bump of the plurality of bumps.

4. The display apparatus of claim 3, wherein the fine pattern comprises at least one slit extending in a longitudinal direction of the bump line for each bump of the plurality of bumps, wherein the bump line is divided into a plurality of sub bump lines by the slit.

5. The display apparatus of claim 1, wherein the bump line for each bump of the plurality of bumps comprises at least one of gold (Au), chromium (Cr), silver (Ag), molybdenum (Mo), aluminum (Al), copper (Cu), titanium (Ti), indium tin oxide (ITO), indium zinc oxide (IZO), or an alloy thereof.

6. The display apparatus of claim 1, wherein the non-conductive elastic polymer comprises at least one of polyimide, polyacrylate, polycarbonate, polyepoxy, or polyacryl.

7. The display apparatus of claim 1, wherein the display panel comprises:
   a first substrate connected to the driving chip;
   a second substrate facing the first substrate; and
   a liquid crystal layer disposed between the first substrate and the second substrate.

* * * * *